US00RE46672E

(19) United States
(12) Reissued Patent
Hall

(10) Patent Number: US RE46,672 E
(45) Date of Reissued Patent: Jan. 16, 2018

(54) HIGH DEFINITION LIDAR SYSTEM

(71) Applicant: Velodyne Lidar, Inc., Dover, DE (US)

(72) Inventor: David S. Hall, San Jose, CA (US)

(73) Assignee: Velodyne Lidar, Inc., Dover (DE)

(21) Appl. No.: 15/180,580

(22) Filed: Jun. 13, 2016

Related U.S. Patent Documents

Reissue of:
(64) Patent No.: 8,767,190
Issued: Jul. 1, 2014
Appl. No.: 13/109,901
Filed: May 17, 2011

U.S. Applications:
(63) Continuation-in-part of application No. 11/777,802, filed on Jul. 13, 2007, now Pat. No. 7,969,558.

(60) Provisional application No. 61/345,505, filed on May 17, 2010, provisional application No. 60/807,305, filed on Jul. 13, 2006.

(51) Int. Cl.
*G01C 3/08* (2006.01)
*G01S 7/481* (2006.01)
*G01S 17/89* (2006.01)

(52) U.S. Cl.
CPC ..... *G01S 7/4813* (2013.01); *G01S 17/89* (2013.01)

(58) Field of Classification Search
CPC ..... G01S 7/4813; G01S 17/89
USPC ..... 356/5.01, 3.01, 4.01, 4.07, 5.09, 9, 625; 382/103, 105, 154; 358/453, 475, 480
See application file for complete search history.

(56) References Cited

U.S. PATENT DOCUMENTS 3,064,252 A 11/1962 Varela
4,681,433 A * 7/1987 Aeschlimann ..... G01S 17/88 356/141.1
4,834,531 A 5/1989 Ward
4,862,257 A 8/1989 Ulich
4,895,440 A * 1/1990 Cain ..... G01C 15/002 172/4.5
4,952,911 A 8/1990 D'Ambrosia et al.
5,212,533 A * 5/1993 Shibuya et al. ..... 356/5.15
(Continued)

FOREIGN PATENT DOCUMENTS

EP 2177931 A2 4/2010
EP 2177931 A2 4/2016
(Continued)

OTHER PUBLICATIONS

Juberts, et al., "Status report on next generation LADAR for driving unmanned ground vehicles" Mobile Robots XVII, edited by Douglas W. Gage, Proceedings of SPIE, vol. 5609, pp. 1-12, 2004.

(Continued)

*Primary Examiner* — Kenneth J Whittington
(74) *Attorney, Agent, or Firm* — Lowe Graham Jones PLLC

(57) ABSTRACT

A LiDAR-based 3-D point cloud measuring pattern includes a base, a housing, a plurality of photon transmitters and photon detectors contained within the housing, a rotary motor that rotates the housing about the base, and a communication component that allows transmission of signals generated by the photon detectors to external components. In several versions of the invention, the system includes a vertically oriented motherboard, thin circuit boards such as ceramic hybrids for selectively mounting emitters and detectors, a conjoined D-shaped lens array, and preferred firing sequences.

20 Claims, 12 Drawing Sheets

(56) References Cited

U.S. PATENT DOCUMENTS

| | | | | |
|---|---|---|---|---|
| 5,877,688 | A | 3/1999 | Morinaka et al. | |
| 6,034,803 | A | 3/2000 | Sullivan et al. | |
| 6,327,806 | B1 | 12/2001 | Paige | |
| 6,335,789 | B1 * | 1/2002 | Kikuchi | 356/141.1 |
| 6,441,889 | B1 * | 8/2002 | Patterson | 356/28 |
| 6,504,712 | B2 * | 1/2003 | Hashimoto et al. | 361/679.54 |
| 6,593,582 | B2 | 7/2003 | Lee et al. | |
| 6,636,300 | B2 | 10/2003 | Doemens et al. | |
| 6,646,725 | B1 | 11/2003 | Eichinger et al. | |
| 6,650,402 | B2 * | 11/2003 | Sullivan et al. | 356/4.91 |
| 6,682,478 | B2 * | 1/2004 | Nakamura | 600/111 |
| 7,030,968 | B2 | 4/2006 | D'Aligny et al. | |
| 7,106,424 | B2 * | 9/2006 | Meneely et al. | 356/5.01 |
| 7,190,465 | B2 | 3/2007 | Froehlich et al. | |
| 7,248,342 | B1 | 7/2007 | Degnan | |
| 7,281,891 | B2 | 10/2007 | Smith et al. | |
| 7,583,364 | B1 | 9/2009 | Mayor et al. | |
| 8,310,653 | B2 * | 11/2012 | Ogawa | G01S 7/4812 356/28 |
| 2002/0003617 | A1 | 1/2002 | Doemens et al. | |
| 2003/0043363 | A1 | 3/2003 | Jamieson et al. | |
| 2003/0090646 | A1 | 5/2003 | Riegl et al. | |
| 2003/0163030 | A1 * | 8/2003 | Arriaga | 600/182 |
| 2006/0132635 | A1 | 6/2006 | Land | |
| 2006/0186326 | A1 | 8/2006 | Ito | |
| 2006/0197867 | A1 | 9/2006 | Johnson et al. | |
| 2007/0035624 | A1 | 2/2007 | Lubard et al. | |
| 2007/0071056 | A1 * | 3/2007 | Chen | G01S 7/4814 372/50.124 |
| 2007/0201027 | A1 | 8/2007 | Doushkina et al. | |
| 2007/0219720 | A1 | 9/2007 | Trepagnier et al. | |
| 2008/0013896 | A1 * | 1/2008 | Salzberg et al. | 385/89 |
| 2008/0074640 | A1 | 3/2008 | Walsh et al. | |
| 2009/0168045 | A1 * | 7/2009 | Lin | G01C 15/002 356/4.01 |
| 2010/0020306 | A1 | 1/2010 | Hall | |
| 2010/0046953 | A1 | 2/2010 | Shaw et al. | H01S 5/423 398/115 |

FOREIGN PATENT DOCUMENTS

| | | |
|---|---|---|
| JP | H3-6407 | 1/1991 |
| JP | 2001-256576 | 9/2001 |
| JP | 2005-297863 | 10/2005 |
| WO | WO 2008/008970 | 1/2008 |

OTHER PUBLICATIONS

Liu, et al., "Coupling Study of a Rotary Capacitive Power Transfer System" Industrial Technology, 2009. ICIT 2009. IEEE International Conference, IEEE, Piscataway, NJ, USA, Feb. 10, 2009. pp. 1-6.

Office of the Federal Register National Archives and Records Administration, "Code of Federal Regulations, 21, Parts 800 to 1299, Revised as of Apr. 1, 2005, Food and Drugs", pp. 1-23, Apr. 1, 2005.

Robert L. Gustavson, "Diode-laser radar for low-cost weapon guidance", SPIE vol. 1633 Laser Radar VII (1992) / 21, pp. 1-12.

Albert V. Jelalian, "Laser Radar Systems", Artech House 1991, pp. 1-3.

Hirohiko Kawata, "Development of ultra-small lightweight optical range sensor system", IEEIRS/RSJ International Conference on Intelligent Robot Systems Aug. 2005, pp. 1-7.

Clifton S. Fox, "Active Electro-Optical Systems", The Infrared and Electro-Optical Systems Handbook, vol. 6, 1993, pp. 1-80.

Merrill I. Skolnik, "Introduction to Radar Systems" Second Edition, McGraw-Hill Book Company, 1980, pp. 1-3.

Nestinghouse, "AN/TPS-43 E Tactical Radar System", pp. 1-14.

Hall, et al., "Team DAD Technical Paper," DARPA Grand Challenge 2005, XP-002543336, pp. 1-12; Aug. 26, 2005.

* cited by examiner

HIGH DEFINITION LIDAR SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

PRIORITY CLAIM *AND CROSS-REFERENCE TO RELATED APPLICATIONS*

This application is a *reissue of U.S. Pat. No. 8,767,190, issued Jul. 1, 2014, which claims the benefit of U.S. provisional application Ser. No. 61/345,505 filed May 17, 2010 and which is a* continuation-in-part of U.S. application Ser. No. 11/777,802, *now U.S. Pat. No. 7,969,558,* filed Jul. 13, 2007, [and further] *which* claims the benefit of U.S. provisional application Ser. No. 60/807,305 filed Jul. 13, 2006[, and U.S. provisional application Ser. No. 61/345,505 filed May 17, 2010]. The contents of each of the foregoing applications are hereby incorporated by reference. *More than one reissue application has been filed for the reissue of U.S. Pat. No. 8,767,190. The reissue applications are U.S. application Ser. No. 15/180,580 (the present application); and Ser. Nos. 15/700,543, 15/700,558, 15/700,571, 15/700,836, 15/700,844, 15/700,959, and 15/700,965, each of which is a reissue continuation of the present application.*

BACKGROUND OF THE INVENTION

The present invention concerns the use of light pulses that are transmitted, reflected from external objects, and received by a detector to locate the objects in the field of view of the transmitter. By pulsing a laser emitter and receiving the reflection, the time required for the pulse of light to return to the detector can be measured, thereby allowing a calculation of the distance between the emitter and the object from which the pulse was reflected.

When multiple pulses are emitted in rapid succession, and the direction of those emissions is varied, each distance measurement can be considered a pixel, and a collection of pixels emitted and captured in rapid succession (called a "point cloud") can be rendered as an image or analyzed for other reasons such as detecting obstacles. Viewers that render these point clouds can manipulate the view to give the appearance of a 3-D image.

In co-pending application Ser. No. 11/777,802, the applicant described a variety of systems for use in creating such point cloud images using Laser Imaging Detection and Ranging (LiDAR). In one version, the LiDAR system was used for terrain mapping and obstacle detection, and incorporated as a sensor for an autonomous vehicle. An exemplary LiDAR system included eight assemblies of eight lasers each as shown in FIG. 1, or two assemblies of 32 lasers each forming a 64-element LiDAR system as shown in FIG. 2. Yet other numbers of lasers or detectors are possible, and in general the LiDAR was employed in an assembly configured to rotate at a high rate of speed in order to capture a high number of reflected pulses in a full circle around the LiDAR sensor.

The preferred examples of the present invention described further below build on the inventor's prior work as described above, incorporating several improvements to reduce the overall size and weight of the sensor, provide better balance, reduce crosstalk and parallax, and provide other advantages.

SUMMARY OF THE INVENTION

The present invention provides a LiDAR-based 3-D point cloud measuring system. An example system includes a base, a housing, a plurality of photon transmitters and photon detectors contained within the housing, a rotary motor that rotates the housing about the base, and a communication component that allows transmission of signals generated by the photon detectors to external components.

In one version of the invention, the system provides 32 emitter/detector pairs aligned along a vertical axis within a housing that spins to provide a 360 degree field of view. The emitters may be aligned along a first axis, with the detectors aligned along a second axis adjacent to the first.

In a preferred implementation, the emitters and detectors are mounted on thin circuit boards such as ceramic hybrid boards allowing for installation on a vertical motherboard for a vertical configuration, improved alignment, and other advantages. The motherboard, in one version is formed with a hole in which the emitters fire rearward into a mirror, reflecting the emitted light through the hole and through lenses adjacent the motherboard.

In certain configurations, the system employs a conjoint lens system that reduces or eliminates the parallax problem that may arise with the use of separate emitter and detector optics.

In still further examples of the invention, the emitters fire in a non-adjacent pattern, and most preferably in a pattern in which sequentially fired lasers are physically distant from one another in order to reduce the likelihood of crosstalk.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

Figure 1:
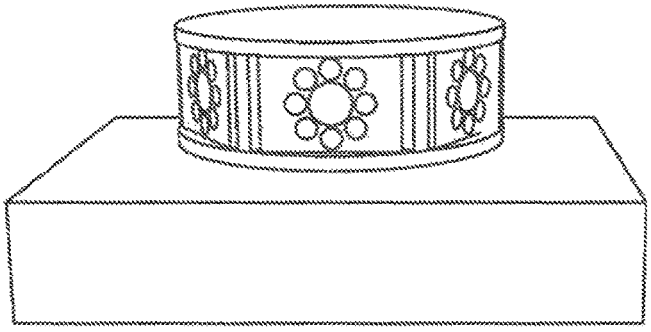
FIG. 1 is a front view of a rotating LiDAR system.
Figure 2:
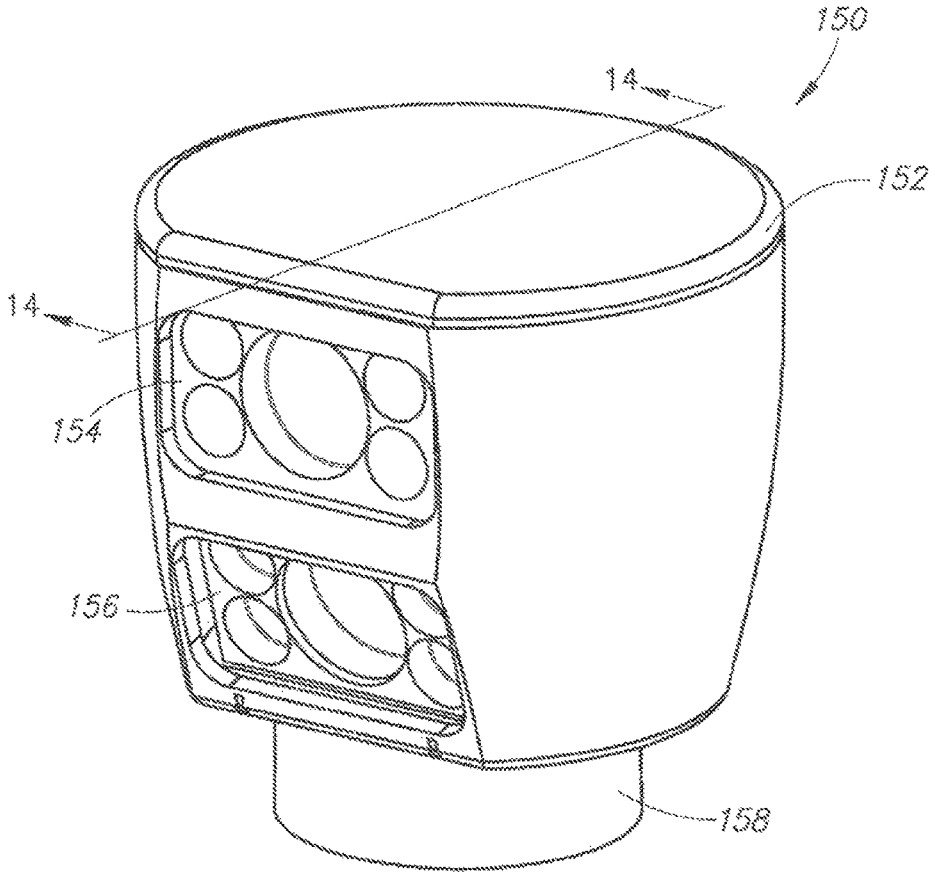
FIG. 2 is a perspective view of an alternate LiDAR system.

Exemplary LiDAR systems are shown in FIGS. 1 and 2. In each case, a rotating housing fires light pulses that reflect from objects so that the return reflections may be detected by detectors within the rotating housing. By rotating the housing, the system provides a 360-degree horizontal field of view (FOV) and, depending on the number and orientation of lasers within the housing, a desired vertical field of view. The system is typically mounted on the top center of a vehicle, giving it a clear view in all directions, and rotates at a rate of about 10 Hz (600 RPM), thereby providing a high point cloud refresh rate, such high rate being advantageous for autonomous navigation at higher speeds. In other versions, the spin rate is within a range of about 5 to 20 Hz (300-1200 RPM). At this configuration, the system can collect approximately 2.56 million time of flight (TOF) distance points per second. The system therefore provides the unique combination of 360 degree FOV, high point cloud density, and high refresh rate. The standard deviation of TOF distance measurements is equal to or less than 2 cm. The LiDAR system may incorporate an inertial navigation system (INS) sensor system mounted on it to report x, y, z deviations and pitch, roll, and yaw of the unit that is used by navigational computers to correct for these deviations.

Through the use of DSP a dynamic power feature allows the system to increase the intensity of the laser emitters if a clear terrain reflection is not obtained by photo detectors (whether due to reflective surface, weather, dust, distance, or other reasons), and to reduce power to the laser emitters for laser life and safety reasons if a strong reflection signal is detected by photo detectors. A direct benefit of this feature is that the LiDAR system is capable of seeing through fog, dust, and heavy rain by increasing laser power dynamically and ignoring early reflections. The unit also has the capability to receive and decipher multiple returns from a single laser emission through digitization and analysis of the waveform generated by the detector as the signal generated from the emitter returns.

The LiDAR systems of FIGS. 1 and 2 report data in the form of range and intensity information via Ethernet (or similar output) to a master navigational system. Using standard trigonometry, the range data is converted into x and y coordinates and a height value. The height value can be corrected for the vehicle's pitch and roll so the resulting map is with reference to the horizontal plane of the vehicle. The map is then "moved" in concert with the vehicle's forward or turning motion. Thus, the sensor's input is cumulative and forms an ultra-high-density profile map of the surrounding environment.

This highly detailed terrain map is then used to calculate obstacle avoidance vectors if required and to determine the maximum allowable speed given the terrain ahead. The LiDAR system identifies of size and distance of objects in view, including the vertical position and contour of a road surface. The anticipated offset of the vehicle from a straight, level path, either vertical or horizontal, at different distances is translated into the G-force that the vehicle will be subject to when following the proposed path at the current speed. That information can be used to determine the maximum speed that the vehicle should be traveling, and acceleration or braking commands are issued accordingly. In all cases the software seeks the best available road surface (and thus the best possible speed) still within the boundaries of a global positioning system (GPS) waypoint being traversed.

One version of the inventor's prior system as illustrated in FIG. 1 includes 64 emitter/detector (i.e. laser diode/photo diode) pairs divided into eight groups of eight. The system shown in FIG. 2 also includes 64 emitter/detector pairs, hut in a configuration of 2 assemblies of 32 pairs. It is also possible to "share" a single detector among several lasers by focusing several detection regions onto a single detector, or by using a single, large detector. By firing a single laser at a time, there would be no ambiguity as to which laser is responsible for a return signal. Conversely, one could also sub-divide a single laser beam into several smaller beams. Each beam would be focused onto its own detector. In any event, such systems are still considered emitter-detector pairs.

In the versions as illustrated in FIGS. 1 and 2, the laser diode is preferably an OSRAM 905 nm emitter, and the photo diode is preferably an Avalanche variety. More particularly, in the preferred version each one of the detectors is an avalanche photodiode detector. The lenses are preferably UV treated to block sunlight, or employ a separate UV lens filter in the optical path. Each pair is preferably physically aligned in ⅓° increments, ranging from approximately 2° above horizontal to approximately 24° below horizontal. Each of the emitter/detector pairs are controlled by one or more DSPs (or, in some versions, field programmable gate arrays, or FPGAs, or other microprocessor), which determines when they will fire, determines the intensity of the firing based on the previous return, records the time-of-flight, calculates height data based time-of-flight and angular alignment of each pair. Results, including multiple returns if any, are transmitted via Ethernet to the master navigational computer via a rotary coupling.

It is also advantageous to fire only several lasers, or preferably just one, at a time. This is because of naturally occurring crosstalk, or system blinding that occurs when the laser beam encounters a retroreflector. Such retroreflectors are commonly used along the roadways. A single beam at a time system is thus resistant to retroreflector blinding, while a flash system could suffer severe image degradation as a result.

In addition to crosstalk concerns, firing single lasers at once while rotating at a high rate facilitates eye safety. The high powered lasers used with the present preferred versions of the invention would require protective eyewear if the system was used in a stationary fashion. Rotation of the system and firing fewer lasers at once for brief pulses allows high powered lasers to be used while still meeting eye safety requirements that do not require protective eyewear. In accordance with this aspect of the invention, the system employs a control component that does not allow the emitters to fire until the head has reached a desired minimal rotation speed.

Another advantage of firing only a small number of lasers at a time is the ability to share, or multiplex, the detection circuitry among several detectors. Since the detection circuitry consists of high speed Analog to Digital Converters (ADCs), such as those made by National Semiconductor, considerable cost savings can be had by minimizing the use of these expensive components.

In the preferred embodiment, the detectors are power cycled, such that only the desired detector is powered up at any one time. Then the signals can simply be multiplexed together. An additional benefit of power-cycling the detectors is that total system power consumption is reduced, and the detectors therefore run cooler and are therefore more sensitive.

A simple DC motor controller driving a high reliability brushed or brushless motor controls the rotation of the emitter/detectors. A rotary encoder feeds rotational position to the DSPs (or other microprocessor) that use the position data to determine firing sequence. Software and physical fail-safes ensure that no firing takes place until the system is rotating at a minimum RPM.

FIG. 2 illustrates a perspective view of a 64 emitter/detector pair LiDAR component 150. The component 150 includes a housing 152 that is opened on one side for receiving a first LiDAR system 154 located above a second LiDAR system 156. The second LiDAR system 156 is positioned to have line of sight with a greater angle relative to horizontal than the first LiDAR system 154. The housing 152 is mounted over a base housing section 158.

The LiDAR system of FIG. 2 includes a magnetic rotor and stator. A rotary coupling, such as a three-conductor Mercotac model 305, passes through the center of the base 158 and the rotor. The three conductors facilitated by the rotary coupling are power, signal, and ground. A bearing mounts on the rotary coupling. A rotary encoder has one part mounted on the rotary coupling and another part mounted on the base section 158 of the housing 152. The rotary encoder, such as a U.S. Digital Model number E65-1000-750-I-PKG1 provides information regarding to rotary position of the housing 152. The magnetic rotor and stator cause rotary motion of the base section 158 and thus the housing 152 about the rotary coupling.

The version described below with reference to FIGS. 3-16 is generally referred to as an High Definition LiDAR 32E (HDL-32E) and operates on the same foundational principles as the sensors of FIGS. 1 and 2 in that a plurality (in this embodiment up to 32) of laser emitter/detector pairs are aligned along a vertical axis with the entire head spinning to provide a 360 degrees horizontal field of view (FOV). Each laser issues light pulses (in this version, 5 ns pulses) that are analyzed for time-of-flight distance information (called a "distance pixel" or "return"). Like the system of FIG. 2, the system reports returns in Ethernet packets, providing both distance and intensity (i.e. the relative amount of light received back from the emitter) information for each return. The sample system reports approximately 700,000 points per second. While all or any subset of the features described above with respect to FIGS. 1 and 2 may be incorporated into the version described below with respect to FIGS. 3-16, alternate embodiments of the invention may optionally include the additional aspects as described in detail below.

Figure 3:
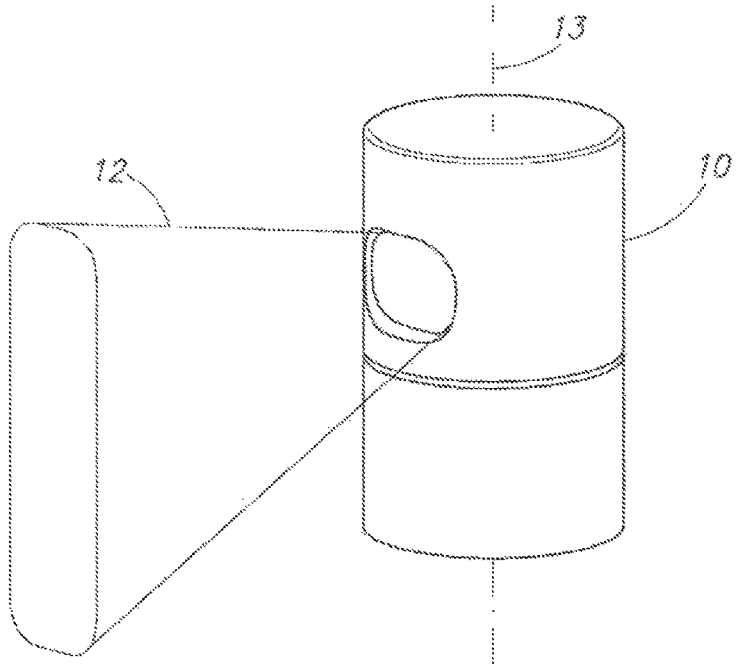
FIG. 3 is a perspective view of a preferred LiDAR system, showing an exemplary field of view of the laser emitters.

In a preferred version as illustrated in FIG. 3, the cylindrical sensor head 10 is about 3.5 inches in diameter and the unit has an overall height of 5.6 inches and weighs about 2.4 pounds. By contrast, the HDL-64E (shown in FIG. 2) is 8 inches in diameter by approximately one foot tall, and weighs about 29 pounds. This reduction in size is the result of several inventive improvements, as described more fully below.

Figure 4:
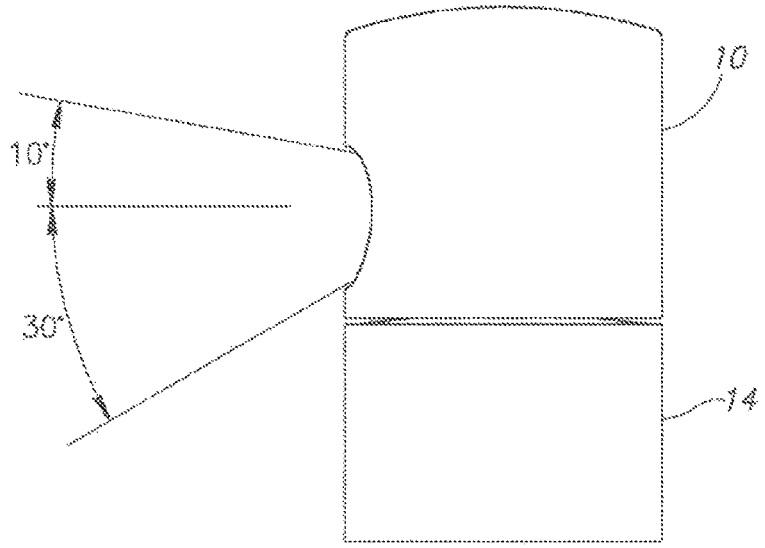
FIG. 4 is a side view of the preferred LiDAR system of FIG. 3.

The sample embodiment of FIG. 3 can be built with a variable number of lasers, aligned over a vertical FOV 12 of +10 to −30 degrees as best seen in FIG. 4. The vertical FOV may be made larger or smaller, as desired, by adjusting the number of orientation of the emitters and detectors. When using the emitters as described and orienting them as described, the range is approximately 100 meters. The head 10 is mounted on a fixed platform 14 having a motor configured such that it preferably spins at a rate of 5 Hz to 20 Hz (300-1200 RPM). The sample system used 905 nm laser diodes (although other frequencies such as 1550 nm could be used) and is Class 1 eye safe.

Figure 5:
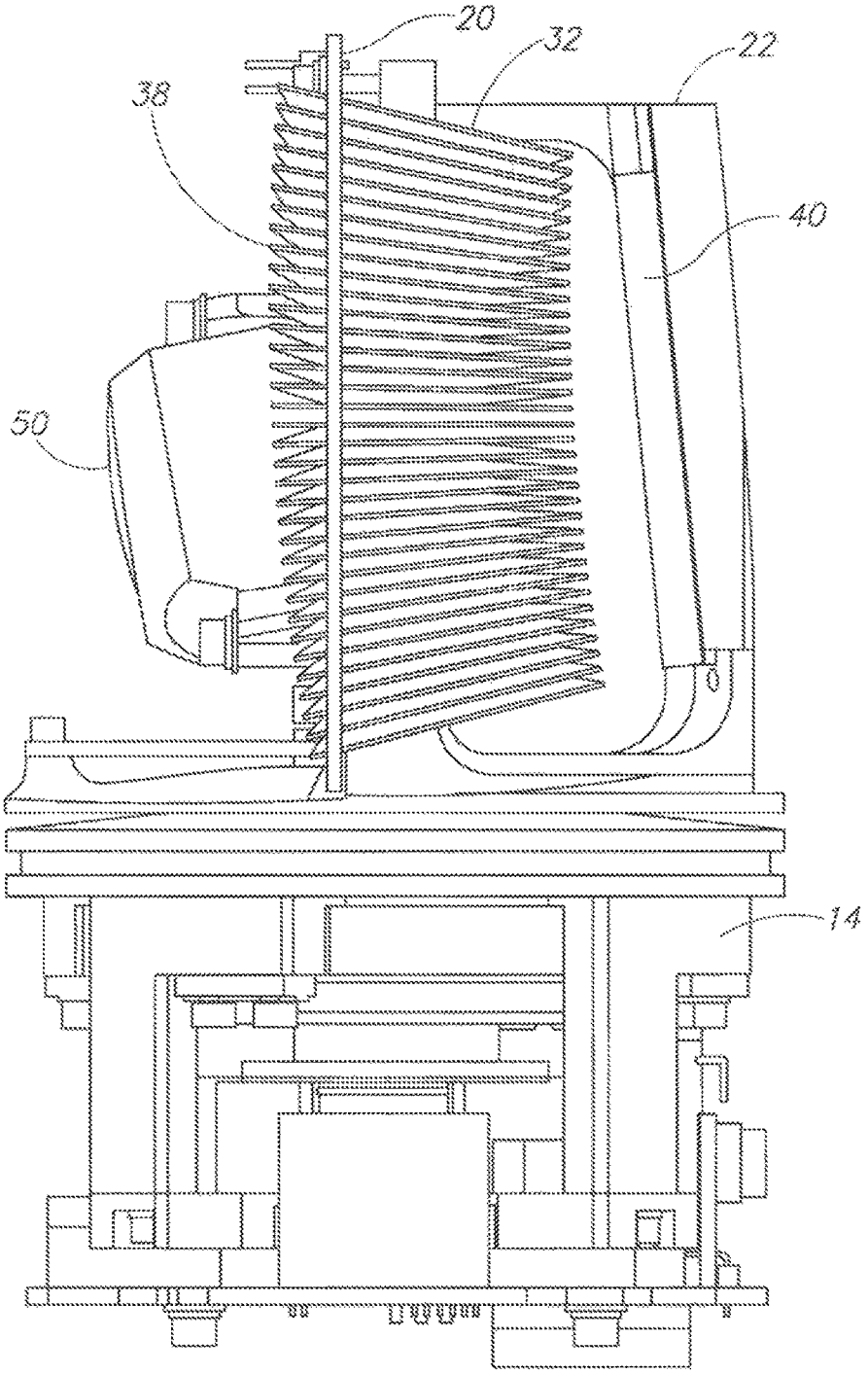
FIG. 5 is a side view of the LiDAR system in accordance with FIG. 4, shown with the housing removed.

FIG. 5 illustrates the same version as shown in FIGS. 3 and 4, though without the outer housing covering the internal components. In general, and as discussed more fully below, the system includes a main motherboard 20 supporting a plurality of detector hybrids 32 and emitter hybrids (not visible in FIG. 5). The emitters fire back toward the rear of the system, where the pulses are reflected from a mirror and then are directed through a lens 50. Return pulses pass through a lens, are reflected by a mirror 40, then directed to the detectors incorporated into the hybrids 32. The motherboard 20 and mirror 40 are mounted to a common frame 22 providing common support and facilitating alignment.

The hybrids 32 are mounted to the motherboard in a fan pattern that is organized about a central axis. In the version as shown, 32 hybrids are used in a pattern to create a field of view extending 10 degrees above and 30 degrees below the horizon and therefore the central axis extends above and below the ninth board 38, with 8 boards above and 23 boards below the central axis. In one version, each successive board is inclined an additional one and one-third degree with respect to the next adjacent board. The desired incremental and overall inclination may be varied depending on the number of hybrids used, the geometry of the mirrors and lenses, and the desired range of the system.

Figure 6:
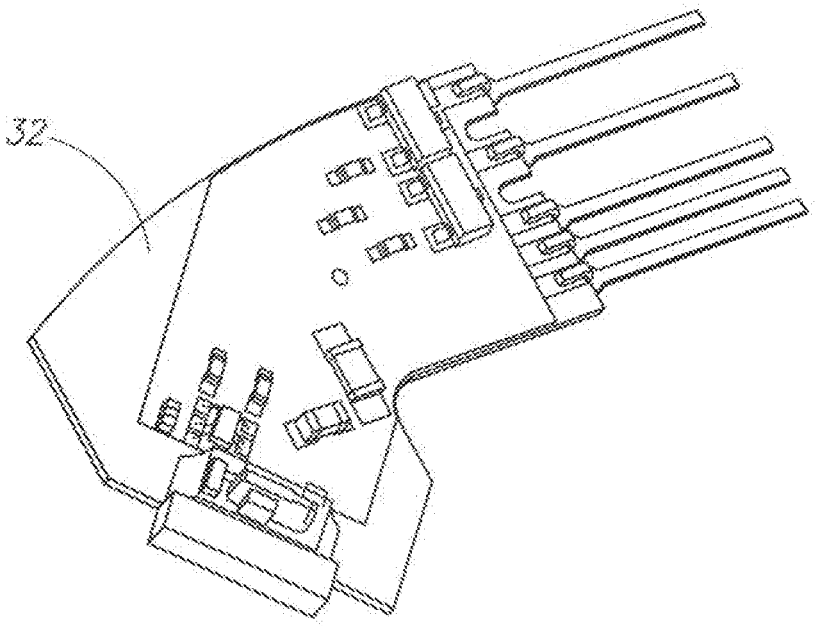
FIG. 6 is a perspective view of a hybrid containing a preferred detector.
Figure 7:
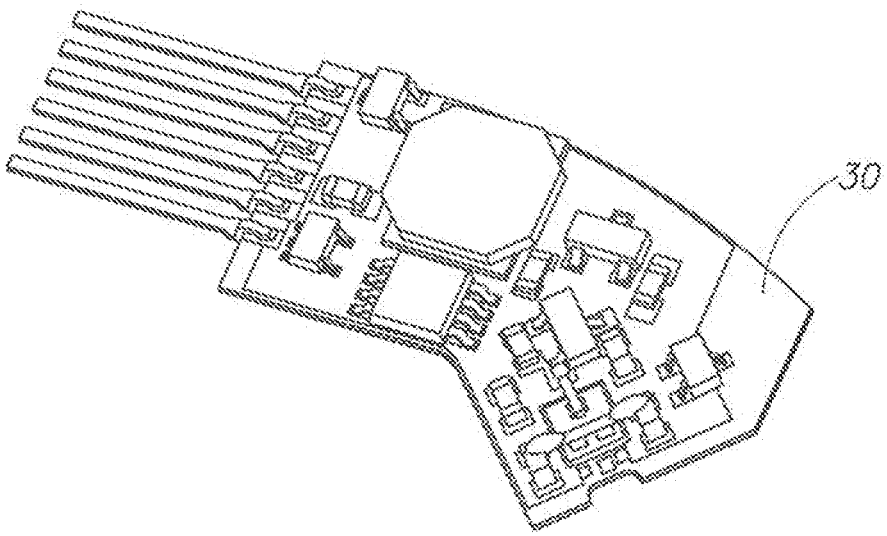
FIG. 7 is a perspective view of a hybrid containing a preferred emitter.

One of the features allowing for compact size and improved performance of the version of FIG. 3 is the use of thin circuit boards such as ceramic hybrid boards for each of the emitters and detectors. An exemplary detector circuit board 32 is shown in FIG. 6; an exemplary emitter circuit board 30 is shown in FIG. 7. In the preferred example, the thin circuit boards are in the form of ceramic hybrid boards that are about 0.015 inches thick, with only one emitter mounted on each emitter board, and only one detector mounted on each detector board. In other versions the thin circuit boards may be formed from other materials or structures instead of being configured as ceramic hybrids.

Figure 8:
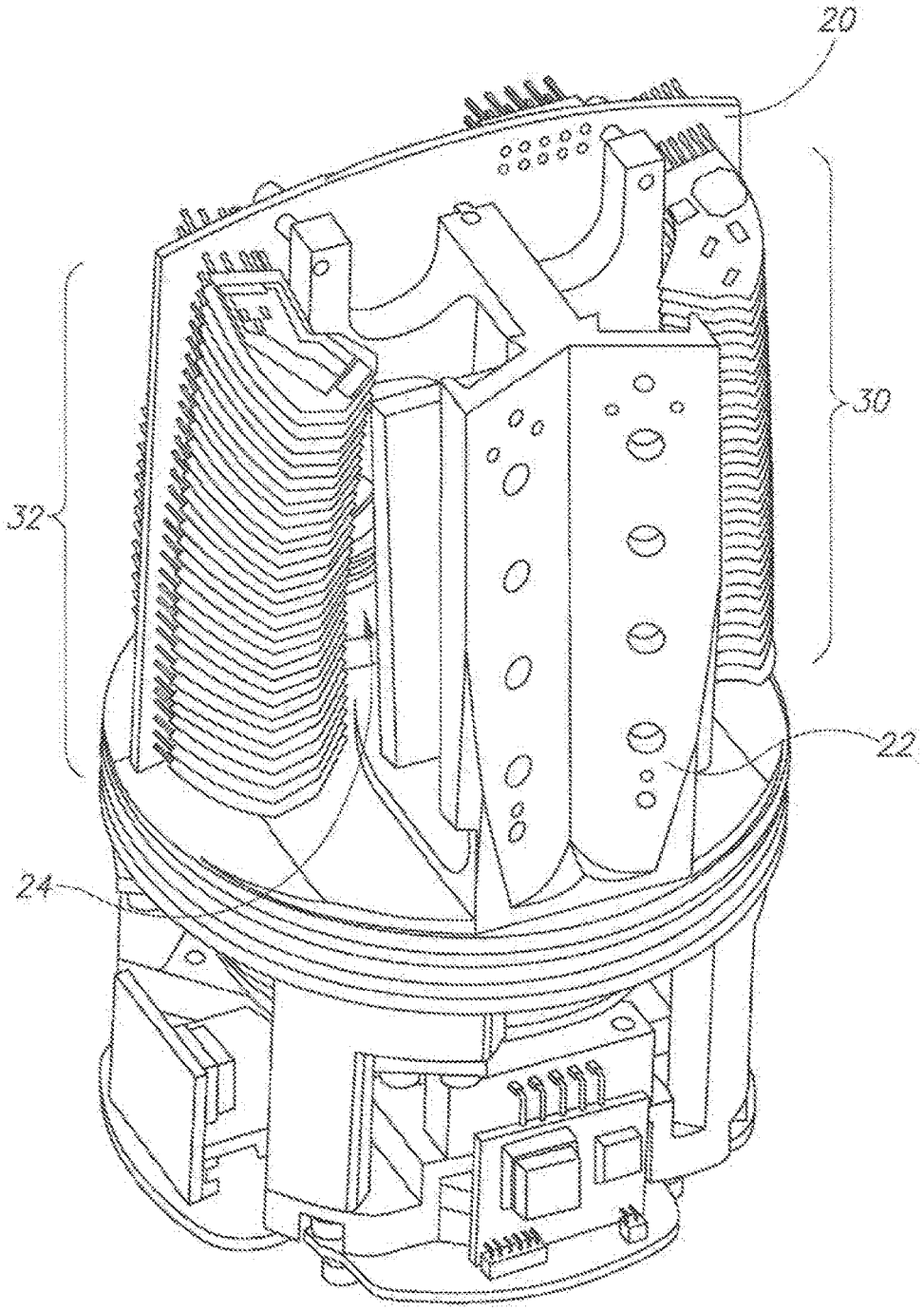
FIG. 8 is a back perspective view of the LiDAR system as shown in FIG. 5.

One of the advantages of mounting emitters and detectors on individual hybrid boards is the ability to then secure the individual hybrid boards to the motherboard in a vertically aligned configuration. In the illustrated version, the detectors are positioned in a first vertical alignment along a first vertical axis while the emitters are positioned in a second vertical alignment along a second vertical axis, with the first and second vertical axes being parallel and next to one another. Thus, as best seen in FIGS. 5 and 8, the hybrid boards carrying the emitters and detectors are mounted in vertical stacks that allow the sensor head to have a smaller diameter than a differently configured sensor having emitters and detectors positioned about the circumference of the system. Accordingly, the configuration reduces the overall size and requires less energy for spinning by moving more of the weight toward the center of the sensor.

As further shown in FIG. 8, the preferred version incorporates a plurality of detectors (in this case, 32 of them) mounted to an equal number of detector hybrids 32. The system likewise has the same number of emitters mounted to an equal number of emitter hybrids 30. In the preferred version, the system therefore has one emitter per hybrid and one detector per hybrid. In other versions this may be varied, for example to incorporate multiple emitters or detectors on a single hybrid. The emitter and detector hybrids are connected to a common motherboard 20, which is supported by a frame 22. The motherboard has a central opening 24 that is positioned to allow emitted and received pulses to pass through the motherboard. Because the lenses are positioned over the middle of the motherboard, the central opening is configured to be adjacent the lenses to allow light to pass through the portion of the motherboard that is next to the lenses.

The density of emitter/detector pairs populated along the vertical FOV is intentionally variable. While 32 pairs of emitters and detectors are shown in the illustrated versions, the use of hybrids and a motherboard allows for a reduction in the number of emitters and detectors by simply removing or not installing any desired number of emitter/detector pairs. This variation of the invention cuts down on the number vertical lines the sensor produces, and thus reduce cost. It is feasible that just a few emitter/detector pairs will accomplish the goals of certain autonomous vehicles or mapping applications. For some uses increased density is desirable to facilitate seeing objects at further distances and with more vertical resolution. Other uses exploit the fact that there is a direct relationship between the number of emitter detector pairs and sensor cost, and do not need the full spread of vertical lasers to accomplish their sensor goals.

Alternatively, multiple emitters and detectors can be designed and mounted onto the hybrid boards at slightly different vertical angles, thus increasing the density of vertical FOV coverage in the same footprint. If, for example, two emitters and two detectors were mounted on each of the hybrids shown in FIGS. 6 and 7 with slight vertical offsets, the design would incorporate 64 emitters and detectors rather than 32. This example design describes two emitters and detectors mounted per board, but there is no practical limit to the number of emitters and detectors that may be mounted on a single board. The increased number of emitters and detectors may be used to increase the field of view by adjusting the relative orientation, or may be used to increase the density of points obtained within the same field of view.

Another design feature of the preferred version is the vertical motherboard on which the main electronics that control the firing of the lasers and the capturing of returns are located. As noted above, the motherboard is mounted vertically, defining a plane that is preferably parallel to the central axis 13 (see FIG. 3) about which the system will rotate. While the motherboard is preferably parallel to this axis of rotation, it may be inclined toward a horizontal plane by as much as 30 degrees and still be considered substantially vertical in orientation. The emitter and detector hybrid boards are aligned and soldered directly to this vertical motherboard, thus providing for small overall head size and increased reliability due to the omission of connectors that connect the laser boards with the motherboard. This board is mechanically self-supported, mounted to a frame 22 that fixes it rigidly in position in a vertical orientation so that it spins with the rotating sensor head. The insertion of the hybrid boards can be automated for easy assembly. Prior art sensors exclusively employ motherboard design requiring connectors and cables between the emitters and detectors and the motherboard. The positioning and configuration of the motherboard as shown overcomes these problems.

Figure 9:
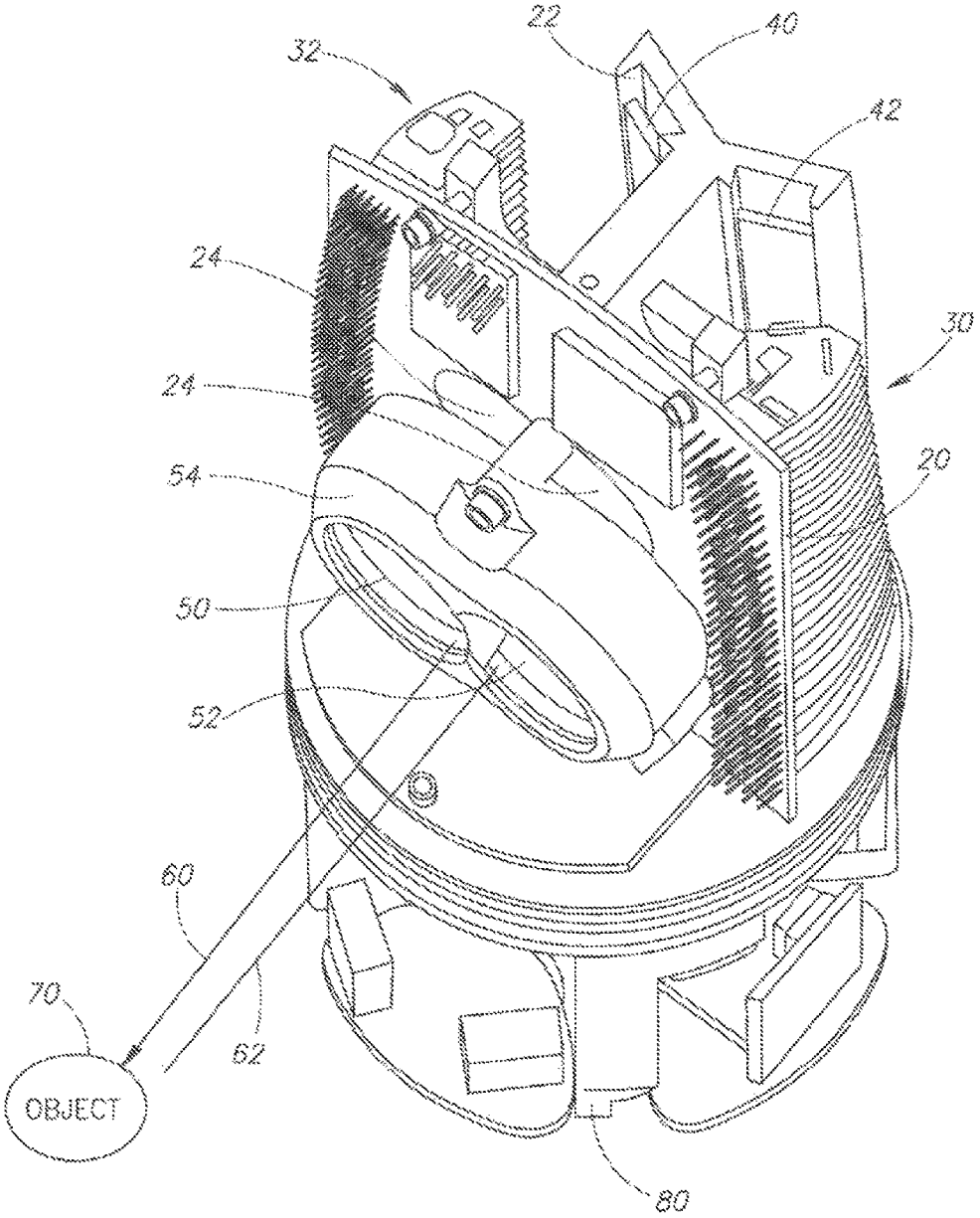
FIG. 9 is a top perspective view of the LiDAR system as shown in FIG. 5.

Another feature of the vertical motherboard design is its proximity inside the sensor head. In order to optimize space, the motherboard is positioned between the mirror and the lenses, as best seen in FIG. 9. Thus, as shown, the sensor head includes one or more lenses 50, 52 supported within a lens frame 54 positioned at a front side of the sensor head. One or more mirrors 40, 42 are positioned at the opposite side of the sensor head and mounted to the frame 22. In the illustrated version, separate mirrors 40, 42 are used for the emitter and detectors, respectively. Most preferably, the frame 22 is a unitary frame formed from a single piece of material that supports the motherboard and the mirrors.

This configuration allows the hybrid emitters to fire rearward into the first mirror 40, wherein the light then reflects off the mirror and travels through the hole 24 in the motherboard 20, through the lens 50 and so that the emitter light 60 travels out to the target 70. This configuration further increases the net focal length of the light path while retaining small size. Likewise the returning light 62 passes through the detector lens 52, through the hole 24 in the motherboard to the opposite mirror 52 and is reflected into the corresponding detector.

Another benefit of the vertical motherboard design is that it facilitates the goal of balancing the sensor head both statically and dynamically to avoid shimmy and vibration during operation. Most preferably, the various components are positioned to allow a near-balanced condition upon initial assembly that requires a minimum of final static and dynamic balancing counterweights. As best seen in FIG. 9, this balancing is obtained by positioning major portions of components about the circumference of the sensor head. More specifically, the lenses and frame are on one side while the mirrors and a generally T-shaped portion of the frame is diametrically opposite the lenses, with the mirrors and rearward portion of the frame configured to have a weight that is about equal to that of the lenses and lens frame. Likewise, the emitter and detector hybrids are carried on diametrically opposite sides of the sensor head, positioned at about a 90 degree offset with respect to the lens and mirror diameter. The motherboard is nearly along a diameter, positioned to counter balance the weight of the other components, such that the center of gravity is at the center of rotation defined by the center of the base 80.

When the present invention is incorporated into an autonomous navigation or mobile mapping vehicle, GPS and inertial sensors are often included to locate the vehicle in space and correct for normal vehicle motion. Inertial sensors often include gyros, such as fiber optic gyros (FOG), and accelerometers. In one embodiment, there is a 6-axis inertial sensor system mounted in the LiDAR base and the signals from the gyros and accelerometers are output along with the LiDAR distance and intensity data.

The separate location of emitters' and detectors' optical paths can create a parallax problem. When the emitters and detectors are separated by a finite distance there always exists a "blind" region nearest to the sensor in which objects cannot be illuminated or detected. Likewise, at long range the emitter's laser light becomes misaligned with its corresponding detector and creates a similar blind spot. The parallax problem is best seen with reference to FIG. 10. A representative emitter 170 transmits a light signal through a lens 172, with the propagated light signal traveling outward and toward a target in the distance. Light reflected from a target may return through a second lens 162 and onward toward a detector 160. The nonparallel orientation of the emitter and detector, however, creates nonparallel light emitter and detector paths. Consequently, there is a near blind spot 180 adjacent the system and a far blind spot 184 more distant from the system. In either of the two blind spots, light reflecting from an object will return along a path that cannot be received by the detector. The near blind spot extends for a distance "A" in front of the system, while the far blind spot extends in the region of distance "C" beyond the system. Between the two blind spots, in a distance defined by "B", the system will see an object in that light reflected from the object can return along a path that can be detected. Even within the region B, however, there is a "sweet spot" 182 defined by the straight line paths of travel from the emitter and to the detector. For the sample embodiment shown in FIGS. 1 and 2 the "sweet spot" 182 for parallax alignment is approximately 100 feet from the centerline of the sensor. Inside of about 10 feet the emitter's light misses its corresponding detector entirely, shown at 180, and beyond approximately 240 feet, shown at 184, the signal becomes weak due to the misalignment of the emitter and detector in the opposite direction.

This effect can be alleviated in one version of the invention by having two "D"-shaped lenses 50, 52 (see FIG. 15), constructed for the emitter and detector, and having these two lenses attached to each other with a minimal gap in between. The close proximity of the conjoint lens system, best seen in FIG. 14, reduces the "blind" region to near zero, as shown by the parallel nature of the emitter's light 60 and detector's light path 62.

Due to the complex nature of the optical propagation in lenses, a lens array is usually needed to correct for various aberrations that are commonly associated with any optical design. For the purpose of constructing a conjoint lens system to overcome the parallax problem described with respect to FIG. 10, it is useful to have the first surface of the lens array being the largest pupil; that is, the optical rays entering the lens system should bend towards the center.

Figure 11:
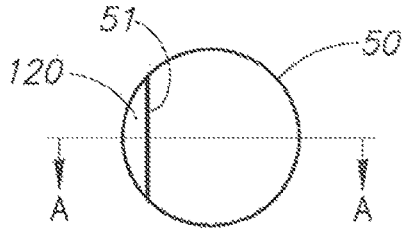
FIG. 11 is an exemplary front view of a lens assembly.
Figure 15:
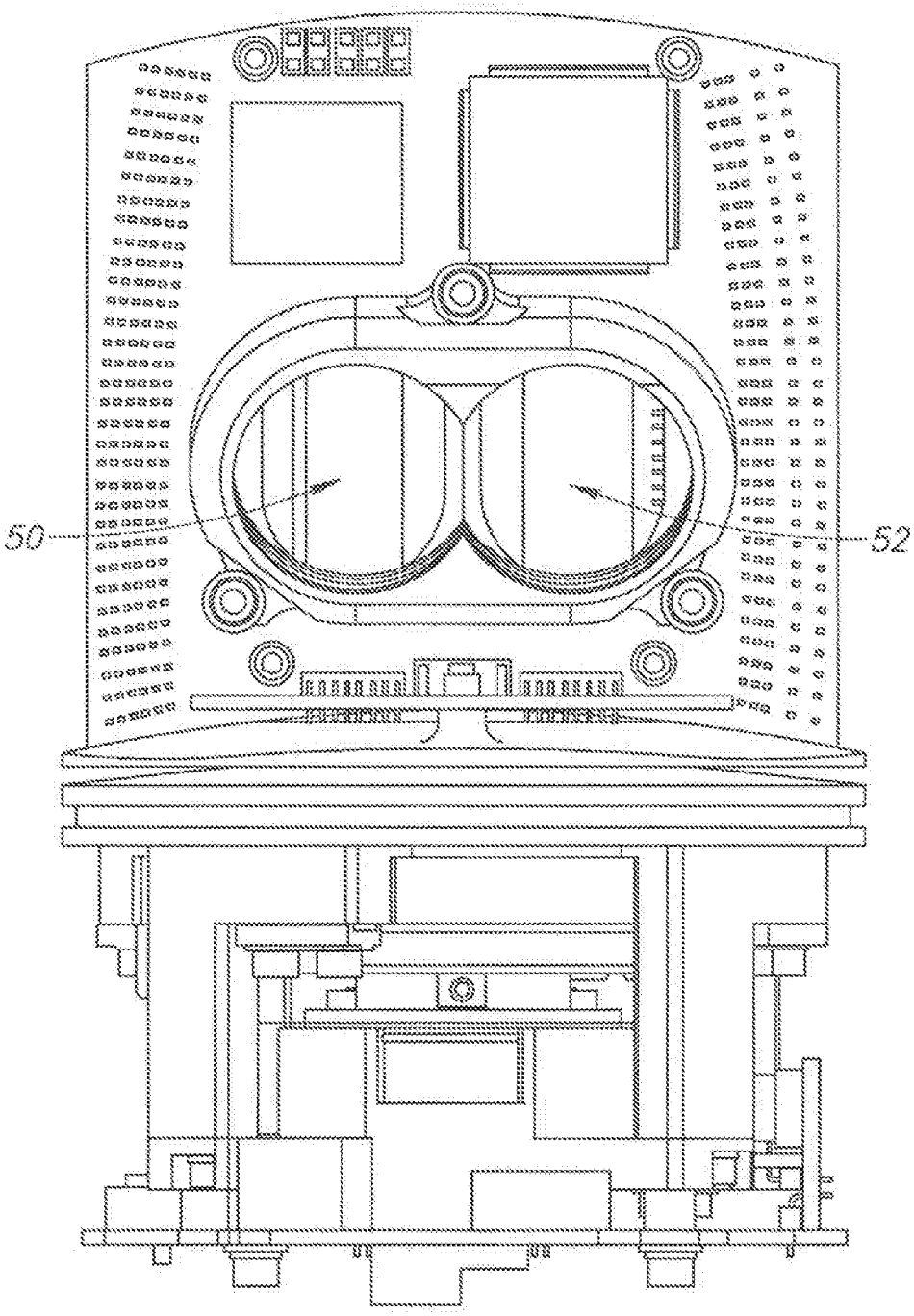
FIG. 15 is a front view of the LiDAR system as shown in FIG. 5.
Figure 16:
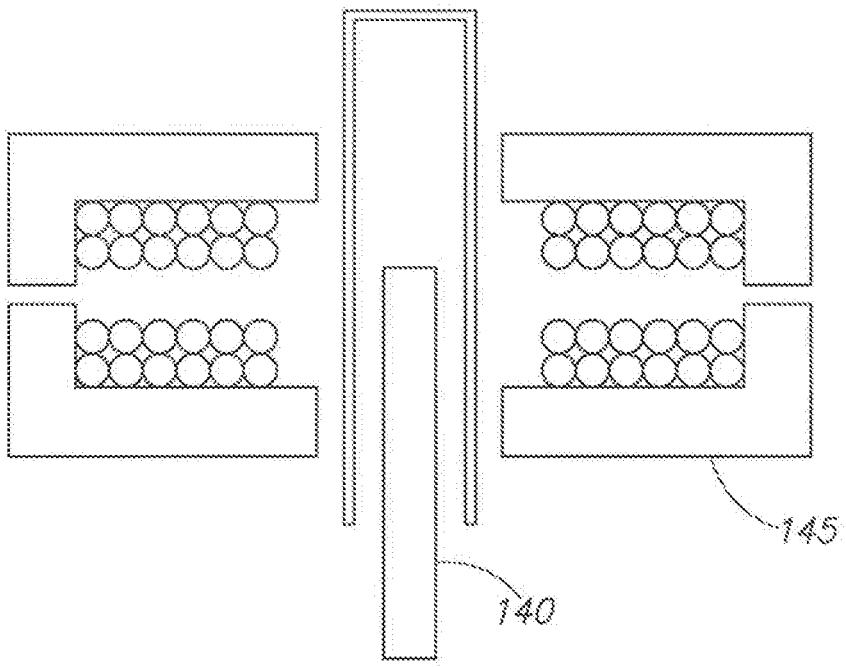
FIG. 16 is an exemplary view of a rotary coupler for coupling a housing to a rotating head assembly.

FIG. 11 illustrates a front view of a lens array 50. Though indicated as the emitter lens array, it may also be illustrative of the detector lens array as well. In order to form a D-shaped lens, an edge 51 of the otherwise circular lens is cut away from the lens, removing a left edge 120 of the otherwise circular lens. The resulting lens is somewhat D-shaped, having a vertical left edge. The use of a D-shaped lens array is advantageous in that D-shaped lens arrays for the emitter and detector may be placed back-to-back to form "conjoined" D-shape lens arrays as best seen in FIG. 15. Placing the vertical edges of the D-shapes adjacent one another allows the otherwise circular lenses to be much closer to one another than would be the case if using circular lenses which would only allow for tangential contact between the lens arrays.

Figure 12:
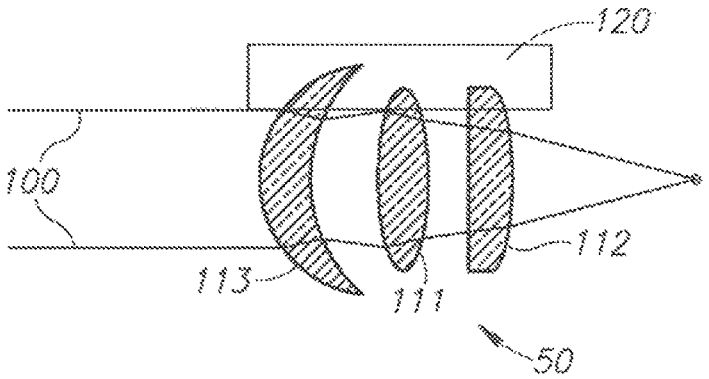
FIG. 12 is a sectional view of a lens assembly, taken along line A-A in FIG. 11.

The creation of D-shaped lenses and the use of a conjoined pair of D-shaped lens arrays, however, brings a potential signal loss. FIG. 12 illustrates a correct design of the lens array, shown in sectional view taken along lines A-A from FIG. 11. In this illustration the lens array includes a first lens 113, a second lens 111, and a third lens 112. The input rays 100 always bend towards the center in this lens array. Consequently, when a D-shaped cut is made (that is, cutting off a portion of one side of each of the lenses in the area indicated by the shaded region 120), there is no loss of light. As the shaded region indicates, all of the light entering the first lens 113 travels through the entire lens array to the mirror.

Figure 13:
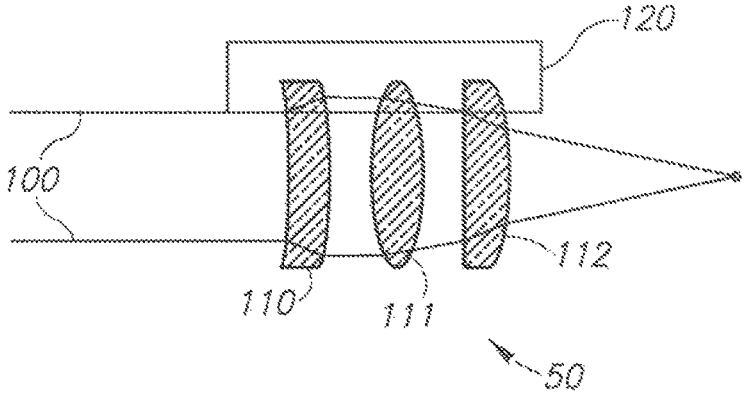
FIG. 13 is a sectional view of an alternate lens assembly, taken along line A-A in FIG. 11.

FIG. 13 illustrates an incorrect design having a similar array of three lenses 110, 111, 112. In this case, the front lens 110 is differently shaped and some of the input light rays 100 bend away from the enter as they travel through the front lens. A cut through the ends of one side of this lens array would result in the loss of some of the light entering the array, as indicated in the shaded region 120 in FIG. 12.

By configuring the lenses in an ideal fashion as illustrated in FIG. 12, a portion of each side of the lens array may be cut in the form of a D-shape. This creates a straight edge along the sides of each lens in the array, allowing the straight sides of the D's forming each lens array to be positioned closely adjacent one another. In this sense, the term "closely adjacent" is understood to mean either in contact with one another or positioned such that the center of the lenses are closer to one another than they could be without the D-shaped cut. As best see in FIG. 15, the two lens arrays 50, 52 are positioned closely adjacent one another with the straight sides back-to-back to form conjoined D-shaped lens arrays. As described above, a first lens array 50 serves as the emitter lens array while the adjacent second lens array 52 serves as the detector lens array.

Figure 10:
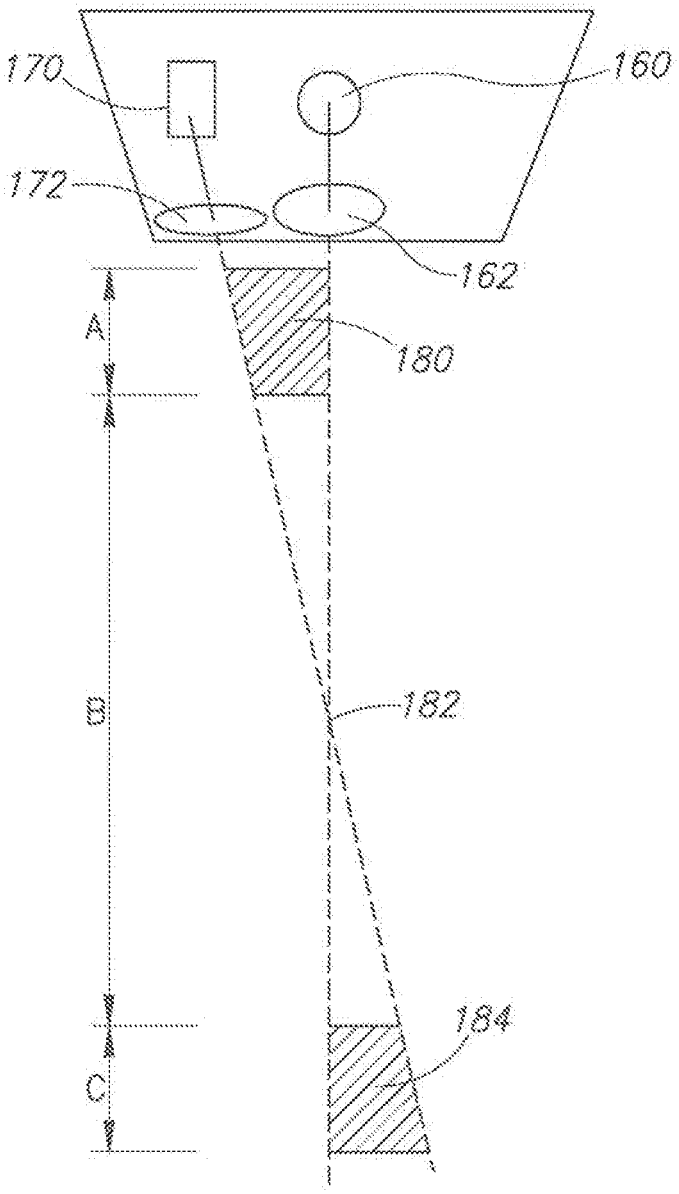
FIG. 10 is an exemplary view of a LiDAR system with a potential parallax problem.
Figure 14:
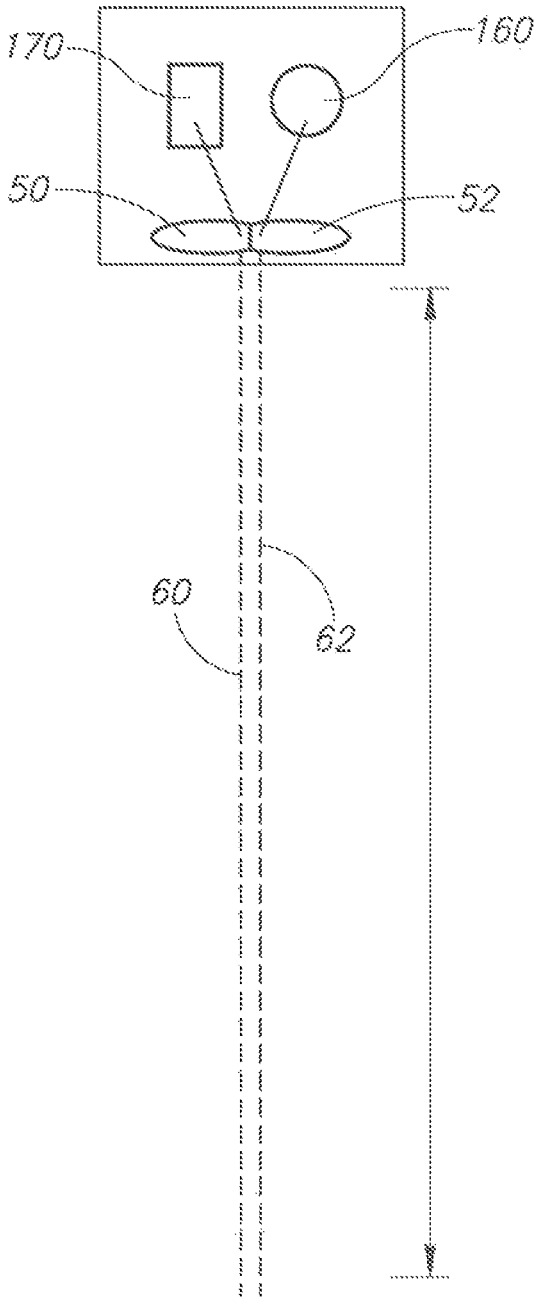
FIG. 14 is a representative view of a conjoined D-shaped lens solving the parallax problem of FIG. 10.

FIG. 14 illustrates an advantage of the conjoint D-shaped lens design, particularly in how it overcomes the parallax problem illustrated in FIG. 10. In this case, light emerging from the emitter 170 is directed to a first D-shaped lens 50. Most preferably, the emitter is oreinted to direct its light path toward a position just inward of the straight side edge of the D-shape. Because of the lens array configuration of the type described in FIG. 12, the light emerges from the first lens 50 in a straight line 60 that can be directed radially away from the sensor head. Likewise, light reflected from the distant object will return along a return path 62 that is parallel to the emitter light path. The closely parallel return path will travel through the second, adjacent conjoined D lens array 52, entering the lens array at a position just inward of the straight side edge of the D-shape, where it is then directed to the detector 160. Consequently, there is no blind spot as with conventional lenses and the parallax problem is resolved.

Another unique design consideration for the preferred implementation addresses the need to transfer power and signal up to the head, and receive signal and offer grounding down from the head. Off the shelf mercury-based rotary couplers are too unreliable and too big for this problem. In one embodiment, shown in FIG. 16, the use of a rotary transformer 145 enables sending power up to the head, and the use of a capacitive coupler 140 down from the head to accommodate these requirements. A phase modulation scheme allows for communication to the head from the base using serial commands in order to instruct the head to limit horizontal field of view, fire all lasers at full power, update its firmware, and other commands.

Figure 17:
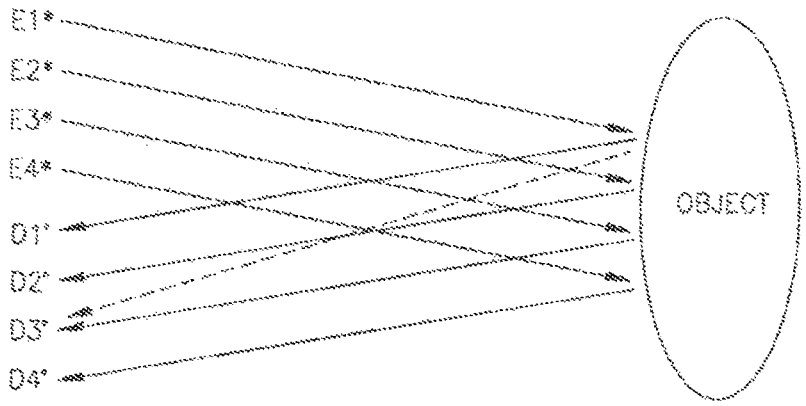
FIG. 17 is an illustration of a potential crosstalk problem.
Figure 18:
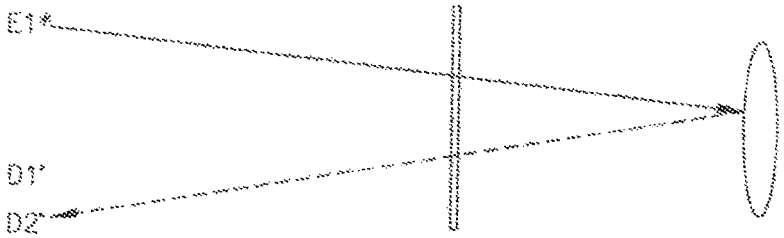
FIG. 18 is an illustration of a further potential crosstalk problem.

It is also desired to have the distance returns of the LiDAR scanner be as accurate as possible and be free of spurious images or returns. Firing multiple lasers at once can create a crosstalk condition where the light emitted from one laser inadvertently is detected by the detector of another laser, thus giving a false return. Thus, with reference to FIG. 17, if emitters E1 through E4 all fire at once, their returns would be intended to be received by emitters D1 through D4. But depending on the positioning and configuration of the object from which the light returns, light from one of the emitters may be directed to the wrong detector. For example, as indicated in FIG. 17, light from emitter E1 may end up directed to detector D3, as indicated by the dotted line return path. This would be an invalid return, and the system would erroneously associate it with light sent from emitter E3, thereby creating a faulty pixel in the point cloud.

A similar error can occur if adjacent lasers are fired in a sequential fashion. Thus, with reference to FIG. 16, firing a single emitter E1 may result in light being detected at detector D2 rather than D1. This may most commonly occur when light from emitter E1 travels beyond the true range of the sensor but is reflected from a particularly reflective object, such as a stop sign covered with reflective paint. The firing of adjacent emitters in order makes this form of cross-talk more likely.

In accordance with a preferred version of the invention, the emitters are fired in a non-adjacent single laser firing order. This means that only one emitter detector pair is active at any given time, and at no time do adjacent emitters and detectors fire in sequence. Most preferably there is as much distance as possible between the emitters that are fired in order. Thus, if there are 32 emitters in a vertical stack, the emitters would be assigned labels E1 representing the topmost emitter and then sequentially numbered through E32 representing the bottom emitter in the stack. Emitter E1 (at the top) would be fired first, followed by emitter E17 (in the middle of the stack), the E2, E18, E3, E19, and so on, ending with E16 and E32 before starting over again at the beginning. This pattern begins with the top emitter and the middle emitter, dividing the stack into two groups. It then alternates firing one from each group, moving from the top of each half-stack and proceeding sequentially down each half-stack of emitters in an this alternating fashion and then repeating. This pattern ensures the largest possible distance between fired lasers, thereby reducing the chance of crosstalk.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A LiDAR-based sensor system comprising:

a base;

head assembly;

a rotary component configured to rotate the head assembly with respect to the base, the rotation of the head assembly defining an axis of rotation;

an electrical motherboard carried in the head assembly, the motherboard defining a plane and being positioned substantially parallel to the axis of rotation;

a lens positioned on the head assembly on a first side of the motherboard;

a mirror positioned on the head assembly on a second side of the motherboard;

a plurality of photon transmitters mounted to a plurality of emitter circuit boards, the plurality of emitter circuit boards being mounted directly to the motherboard; and a plurality of detectors mounted to a plurality of detector circuit boards, the plurality of detector circuit boards being mounted directly to the motherboard.

2. The sensor system of claim 1, wherein the lens comprises an emitter lens and a detector lens, the emitter lens and the detector lens being positioned adjacent one another; and the mirror comprises an emitter mirror and a detector mirror;

wherein the emitter mirror is positioned within the head assembly to reflect light from the plurality of photon transmitters through the emitter lens, and the detector mirror is positioned within the head to reflect light received through the detector lens toward the plurality of detectors.

3. The sensor system of claim 2, further comprising a unitary support structure, the motherboard, detector lens, emitter lens, detector mirror, and emitter mirror all being secured to the unitary support structure.

4. The sensor system of claim 2, wherein the plurality of emitters are oriented to transmit light from the second side of the motherboard toward the emitter mirror.

5. The sensor system of claim 4, wherein the motherboard comprises a central opening, the central opening being positioned to allow light from the emitters to pass from emitter mirror through the central opening and toward the emitter lens.

6. The sensor system of claim 5, wherein the central opening is further positioned to allow light to pass from the detector lens through the central opening and toward the detector mirror.

7. The sensor system of claim 2, wherein the plurality of emitter circuit boards are secured to the motherboard to form a first vertical stack.

8. The sensor system of claim 7, wherein the first vertical stack of emitter circuit boards forms an angularly fanned array.

9. The sensor system of claim 7, wherein the plurality of detector circuit boards are secured to the motherboard to form a second vertical stack, the first vertical stack of emitter circuit boards being positioned substantially parallel to the second vertical stack of detector circuit boards.

10. The sensor system of claim 9, wherein the second vertical stack of detector circuit boards forms an angularly fanned array.

11. The sensor system of claim 2, wherein the emitter lens comprises a first D-shaped lens and the detector lens comprises a second D-shaped lens, a respective vertical side of each of the first D-shaped lens and the second D-shaped lens being positioned closely adjacent one another to form a conjoined D-shaped lens array.

12. The sensor system of claim 11, wherein the first D-shaped lens comprises a first plurality of lenses, and wherein the second D-shaped lens comprises a second plurality of lenses.

13. The sensor system of claim 2, wherein the plurality of emitter circuit boards are secured to the motherboard to form a first vertical stack, the first vertical stack being divided into at least two groups of emitters, each of the at least two groups comprising several emitters from the plurality of emitters such that the at least two groups from non-overlapping subsets of the plurality of emitters, the sensor further having a control component to control the firing of the emitters such that one emitter is fired at a time, the control component further causing firing from one of the at least two groups and then the other of the at least two groups in an alternating fashion.

14. The sensor system of claim 13, wherein the at least two groups comprises:

a first group forming a first portion of the first vertical stack and organized sequentially from a first top position to a first bottom position; and a second group forming a remaining portion of the first vertical stack organized sequentially from a second top position to a second bottom position;

whereby the control component causes firing of the emitters to alternate between the first group and the second group, and further causes firing within the first group to proceed sequentially and firing within the second group to proceed sequentially.

15. The sensor system of claim 2, wherein the rotary component further comprises a capacitive coupler.

16. A LiDAR-based sensor system comprising:

a base;

head assembly;

a motor configured to rotate the head assembly with respect to the base, the rotation of the head assembly defining an axis of rotation;

an electrical motherboard carried in the head assembly;

a plurality of photon transmitters mounted to a plurality of emitter circuit boards, the plurality of emitter circuit boards being mounted to the motherboard;

a plurality of detectors mounted to a plurality of detector circuit boards, the plurality of detector circuit boards being mounted to the motherboard;

an emitter mirror supported within the head assembly;

a detector mirror supported within the head assembly; and a conjoined D-shaped lens assembly, the lens assembly forming an emitter portion and a detector portion;

wherein the motherboard is a unitary component for mounting the plurality of emitter circuit boards and the plurality of detector circuit boards, the motherboard being positioned between the emitter mirror and the detector mirror on a first side and the lens assembly on the other side, the motherboard further having an opening to allow light to pass between the lens assembly and either the detector mirror or the emitter mirror;

whereby light transmitted by one of the plurality of emitters is reflected from the emitter mirror and passes through the emitter portion of the lens assembly, and light received by the detector portion of the lens assembly is reflected by the detector mirror and received by one of the plurality of detectors.

17. The sensor system of claim 16, wherein the motherboard defines a plane that is parallel to the axis of rotation.

18. The sensor system of claim 17, further comprising:

a control component for causing the firing of the plurality of emitters; and further wherein there are n emitters in the plurality of emitters, the n emitters being positioned in a vertical stack from 1 to n, the plurality of emitters being divided into two groups, including a first group of emitters from 1 to n/2 and a second group of emitters from n/2+1 to n; wherein the control component causes the emitters to fire alternatingly between the first group and the second group, and to fire sequentially within each group such that emitter 1 and emitter n/2+1 fire sequentially.

*19. A LiDAR-based sensor system comprising:*

*a base;*

*head assembly;*

*a rotary component configured to rotate the head assembly with respect to the base, the rotation of the head assembly defining an axis of rotation, the head assembly further having a circumference spaced apart from the axis of rotation;*

*an electrical motherboard carried in the head assembly;*

*a lens positioned on the head assembly along the circumference of the head assembly;*

*a mirror positioned on the head assembly along the circumference of the head assembly;*

*a plurality of photon transmitters mounted to a plurality of emitter circuit boards, the plurality of emitter circuit boards being mounted directly to the motherboard; and*

*a plurality of detectors mounted to a plurality of detector circuit boards, the plurality of detector circuit boards being mounted directly to the motherboard.*

*20. A LiDAR-based sensor system comprising:*

*a base;*

*head assembly;*

*a rotary component configured to rotate the head assembly with respect to the base, the rotation of the head assembly defining an axis of rotation, the head assembly further having a circumference spaced apart from the axis of rotation;*

*an electrical motherboard carried in the head assembly;*

*a lens positioned on the head assembly at the periphery of the head assembly;*

*a mirror positioned on the head assembly at the periphery of the head assembly;*

*a plurality of photon transmitters mounted to a plurality of emitter circuit boards, the plurality of emitter circuit boards being mounted directly to the motherboard; and*

*a plurality of detectors mounted to a plurality of detector circuit boards, the plurality of detector circuit boards being mounted directly to the motherboard*

*wherein the center of gravity of the head assembly is at the axis of rotation.*

* * * * *